US012358389B2

(12) United States Patent  
Yu

(10) Patent No.: US 12,358,389 B2  
(45) Date of Patent: Jul. 15, 2025

(54) CHARGING COMMUNICATION MODULE AND CHARGING METHOD OF ELECTRIC VEHICLE

(71) Applicant: HYUNDAI MOBIS Co., Ltd., Seoul (KR)

(72) Inventor: Jong Uk Yu, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 789 days.

(21) Appl. No.: 17/558,973

(22) Filed: Dec. 22, 2021

(65) Prior Publication Data

US 2022/0371466 A1    Nov. 24, 2022

(30) Foreign Application Priority Data

May 20, 2021    (KR) .................. 10-2021-0064756

(51) Int. Cl.
  *H02J 7/00* (2006.01)
  *B60L 53/10* (2019.01)
  *B60L 53/62* (2019.01)
  *B60L 53/66* (2019.01)
  *H02J 7/04* (2006.01)

(52) U.S. Cl.
  CPC .............. *B60L 53/62* (2019.02); *B60L 53/11* (2019.02); *B60L 53/66* (2019.02); *H02J 7/0031* (2013.01); *H02J 7/04* (2013.01); *B60L 2210/30* (2013.01)

(58) Field of Classification Search
  USPC ........................................................ 320/109
  See application file for complete search history.

(56) References Cited

U.S. PATENT DOCUMENTS

| 2012/0139489 | A1  | 6/2012 | Gaul et al. |
| 2012/0187905 | A1* | 7/2012 | Kanayama ............... B60L 53/68 |
|              |     |        | 320/109 |
| 2013/0107408 | A1  | 5/2013 | Le Brun et al. |
| 2015/0043662 | A1  | 2/2015 | Igarashi et al. |

(Continued)

FOREIGN PATENT DOCUMENTS

| CN | 106165306 A | 11/2016 |
| CN | 207853540 U |  9/2018 |

(Continued)

OTHER PUBLICATIONS

Extended European Search Report issued in corresponding European Patent Application No. 21217776.0 dated Jun. 30, 2022.

(Continued)

*Primary Examiner* — Samuel Berhanu  
(74) *Attorney, Agent, or Firm* — MORGAN, LEWIS & BOCKIUS LLP

(57) ABSTRACT

A charging communication module and a charging method of an electric vehicle are provided. The charging communication module includes a voltage sensor that senses a voltage level of a signal line to generate a sensing result, a controller that generates first control information based on the sensing result and converts information of a first communication format provided from the signal line into information of a second communication format, and a switch device that electrically connects or disconnects the signal line with or from the controller based on the first control information.

16 Claims, 5 Drawing Sheets

(56) References Cited

U.S. PATENT DOCUMENTS

2015/0145324 A1* 5/2015 Heath .............. H04L 12/40045
                                                              307/1
2017/0040968 A1    2/2017   Igarashi et al.
2020/0180463 A1    6/2020   Lee et al.

FOREIGN PATENT DOCUMENTS

| JP | WO2013/151007 A1 | 12/2015 |
|---|---|---|
| KR | 10-2015-0078419 A | 7/2015 |
| KR | 10-2015-0078832 A | 7/2015 |
| KR | 10-2019-0096489 A | 8/2019 |
| KR | 10-2020-0075054 A | 6/2020 |

OTHER PUBLICATIONS

Office Action issued in corresponding Korean Patent Application No. 10-2021-0064756 dated Sep. 15, 2022.
Notice of Allowance issued in corresponding Korean Patent Application No. 10-2021-0064756 dated Mar. 15, 2023, with English translation.
Office Action issued in corresponding European Patent Application No. 21217776.0 dated Mar. 13, 2024, with English translation.
Office Action issued Sep. 7, 2023 for corresponding European Patent Application No. 21217776.0.
Office Action dated Jan. 21, 2025 issued in corresponding Chinese Patent Application No. 202210067968.0 with English translation.

* cited by examiner

CHARGING COMMUNICATION MODULE AND CHARGING METHOD OF ELECTRIC VEHICLE

CROSS-REFERENCE TO RELATED APPLICATION

This application claims the benefit of priority to Korean Patent Application No. 10-2021-0064756, filed in the Korean Intellectual Property Office on May 20, 2021, the entire contents of which are incorporated herein by reference.

TECHNICAL FIELD

The present disclosure relates to a charging communication module and a charging method of an electric vehicle.

BACKGROUND

Because an electric vehicle (EV) drives a motor with a power of a battery, the electric vehicle provides the following advantages compared to a conventional gasoline engine vehicle: a decrease of air pollutants such as exhaust gas and noise, a decrease of breakdowns, an increase of lifetime, and a simple driving operation. An electric vehicle charging system may be basically defined as a system that charges a battery mounted in an electric vehicle by using a power from a power distribution network or an energy storage device.

Recently, a charging way to perform customer authentication, charging, and fare imposing at the same time by using power line communication (PLC) is being proposed as one of ways to charging an electric vehicle. To implement the customer authentication and fare imposing through the power line communication, smooth communication between an electric vehicle and an electric vehicle charging system should be accompanied. However, because internal electronic devices of the electric vehicle including a communication device operate at a voltage lower than a charging voltage, the probability that abnormal operations and breakdowns occur due to an overvoltage and an overcurrent capable of being generated at a power line for communication increases.

SUMMARY

The present disclosure has been made to solve the above-mentioned problems occurring in the prior art while advantages achieved by the prior art are maintained intact.

An aspect of the present disclosure provides a charging communication module and a charging method of an electric vehicle, which are capable of making smooth charging and communication possible through a charging cable during charging the electric vehicle, without installation of a separate wired/wireless device, and protecting internal electronic devices of the electric vehicle from an overvoltage and an overcurrent of a power line.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a charging communication module of an electric vehicle may include a voltage sensor that senses a voltage level of a signal line to generate a sensing result, a controller that generates first control information based on the sensing result and converts information of a first communication format provided from the signal line into information of a second communication format, and a switch device that electrically connects or disconnects the signal line with or from the controller based on the first control information.

In an embodiment, the controller may generate the first control information for electrically disconnecting the signal line from the controller when the sensing result indicates that the voltage level of the signal line is higher than or equal to an overvoltage determination reference voltage level, and may generate the first control information for electrically connecting the signal line with the controller when the sensing result indicates that the voltage level of the signal line is higher than or equal to a connection reference voltage level and lower than the overvoltage determination reference voltage level.

In an embodiment, the charging communication module may further include a filter device interposed between the switch device and the controller, and the filter device may transfer a voltage within a given voltage level range from the switch device to the controller.

In an embodiment, the controller may generate, based on the sensing result, second control information to control operation of the filter device.

In an embodiment, the controller may generate the second control information to allow the filter device to operate when the first control information for electrically connecting the signal line and the switch device is generated.

According to an embodiment of the present disclosure, a charging communication module of an electric vehicle may include a voltage sensor that generates a sensing result by sensing a voltage level of each of a plurality of signal lines electrically connected with a plurality of communication lines included in a charging cable, a switch device that electrically connects or disconnects the plurality of signal lines with or from a filter device based on first control information, the filter device that removes a noise included in information of the plurality of signal lines transferred from the switch device based on second control information, a controller that generates the first control information and the second control information based on the sensing result and converts and outputs information of a first communication format, from which the noise is removed by the filter device, into information of a second communication format.

In another embodiment, the plurality of communication lines may include a first communication line, a second communication line, and a third communication line, the first and third communication lines may be lines transferring the information of the first communication format, and the second communication line may be a line transferring information about an electrical connection state of the charging cable and the electric vehicle.

In another embodiment, the plurality of signal lines may include a first signal line, a second signal line, and a third signal line, the second signal line electrically connected with the second communication line may be interposed between the first and third signal lines electrically connected with the first and third communication lines.

In another embodiment, the controller may compare a voltage level of each of the first to third signal lines and a connection reference voltage level of a corresponding signal line to generate the first control information for electrically connecting each of the plurality of signal lines with the filter device, and may compare a voltage level of each of the first to third communication lines and an overvoltage determination reference voltage level of a corresponding signal line to generate the first control information for electrically disconnecting the plurality of signal lines with the filter device.

In another embodiment, the controller may generate the first control information for electrically connecting a signal line, a voltage level of which is higher than or equal to the connection reference voltage level of the corresponding signal line and lower than the overvoltage determination reference voltage level of the corresponding signal line, with the filter device, and may generate the first control information for electrically disconnecting the first to third signal lines from the filter device when a voltage level of at least one of the first to third signal lines is higher than or equal to the overvoltage determination reference voltage level of the corresponding signal line.

In another embodiment, the switch device may include a first switch, a second switch, and a third switch, the first switch may electrically connect or disconnect the first signal line with or from the filter device based on the first control information, the second switch may electrically connect or disconnect the second signal line with or from the filter device based on the first control information, and the third switch may electrically connect or disconnect the third signal line with or from the filter device based on the first control information.

In another embodiment, the filter device includes a first TVS (Transient Voltage Suppressor) diode, a second TVS diode, and a third TVS diode, the first TVS diode may be electrically connected between the first switch and the controller, the second TVS diode may be electrically connected between the second switch and the controller, and the third TVS diode may be electrically connected between the third switch and the controller.

In another embodiment, each of the first to third TVS diodes may transfer a voltage provided from each of the first to third switches to the controller, and the voltage transferred to the controller is a voltage of a given voltage level or lower.

According to an embodiment of the present disclosure, a charging method of an electric vehicle may include comparing a voltage level of a first communication line and a first connection reference voltage level to electrically connect the electric vehicle with the first communication line, comparing a voltage level of a second communication line and a second connection reference voltage level to electrically connect the electric vehicle with the second communication line, comparing the voltage level of the first communication line and a first overvoltage determination reference voltage level to electrically disconnect the first and second communication lines from the electric vehicle, and comparing the voltage level of the second communication line and a second overvoltage determination reference voltage level to electrically disconnect the first and second communication lines from the electric vehicle.

In another embodiment, the comparing of the voltage level of the first communication line and the first connection reference voltage level to electrically connect the electric vehicle with the first communication line may include electrically connecting the first communication line with the electric vehicle when the voltage level of the first communication line is higher than or equal to the first connection reference voltage level, and the comparing of the voltage level of the second communication line and the second connection reference voltage level to electrically connect the electric vehicle with the second communication line may include electrically connecting the second communication line with the electric vehicle when the voltage level of the second communication line is higher than or equal to the second connection reference voltage level.

In another embodiment, the comparing of the voltage level of the first communication line and the first overvoltage determination reference voltage level to electrically disconnect the first and second communication lines from the electric vehicle may include electrically disconnecting the first and second communication lines from the electric vehicle when the voltage level of the first communication line is higher than or equal to the first overvoltage determination reference voltage level, and the comparing of the voltage level of the second communication line and the second overvoltage determination reference voltage level to electrically disconnect the first and second communication lines from the electric vehicle may include electrically disconnecting the first and second communication lines from the electric vehicle when the voltage level of the second communication line is higher than or equal to the second overvoltage determination reference voltage level.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
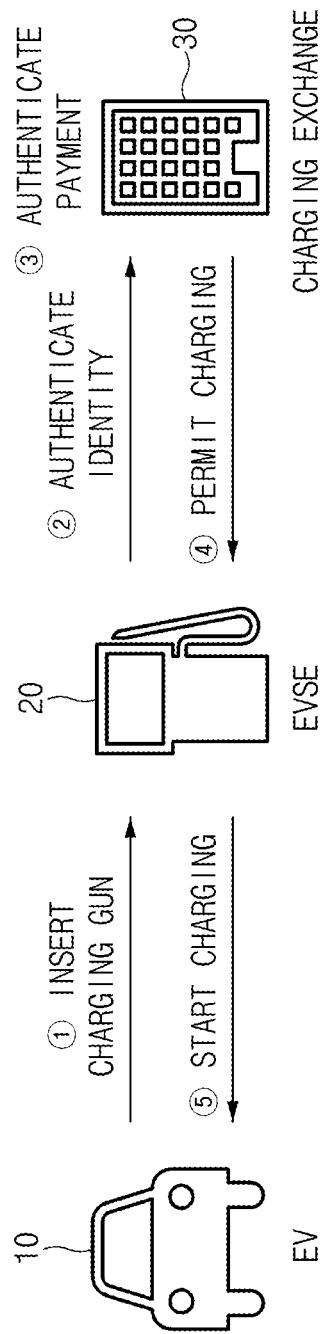
FIG. 1 is a diagram for describing a way to charge an electric vehicle to which a charging communication module of the electric vehicle is applied, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Below, various embodiments of the present disclosure will be described in detail with reference to FIGS. 1 to 5.

FIG. 1 is a diagram for describing a way to charge an electric vehicle to which a charging communication module of the electric vehicle is applied, according to an embodiment of the present disclosure.

An electric vehicle (EV) 10 may obtain driving energy by rotating a motor by using electric energy stored in a battery thereof as a power source. The electric vehicle 10 may be provided with electric energy from a charging device 20 and may charge the electric energy in the battery.

In this case, when a charging gun provided at one end of a charging cable is inserted into the electric vehicle 10, the electric vehicle 10 may be electrically connected with the charging device 20 through the charging cable.

When the electric vehicle 10 and the charging device 20 are electrically connected through the charging cable, data communication between the electric vehicle 10 and the charging device 20 may be possible through the charging cable. In this case, the data communication between the electric vehicle 10 and the charging device 20 may be performed through a power line communication (PLC) manner.

For example, information about a driver or owner stored in an internal electronic device of the electric vehicle 10 may be transferred to the charging device 20 through the data communication.

The charging device 20 may transfer the information about the driver or owner to an authentication institution or a charging exchange 30; when identity and payment authentication for the driver or owner is completed, the charging device 20 may receive charging permission information from the charging exchange 30. When the charging device 20 receives the charging permission information, the electric vehicle 10 connected with the charging device 20 may be provided with electric energy from the charging device 20 so as to charge the battery.

Figure 2:
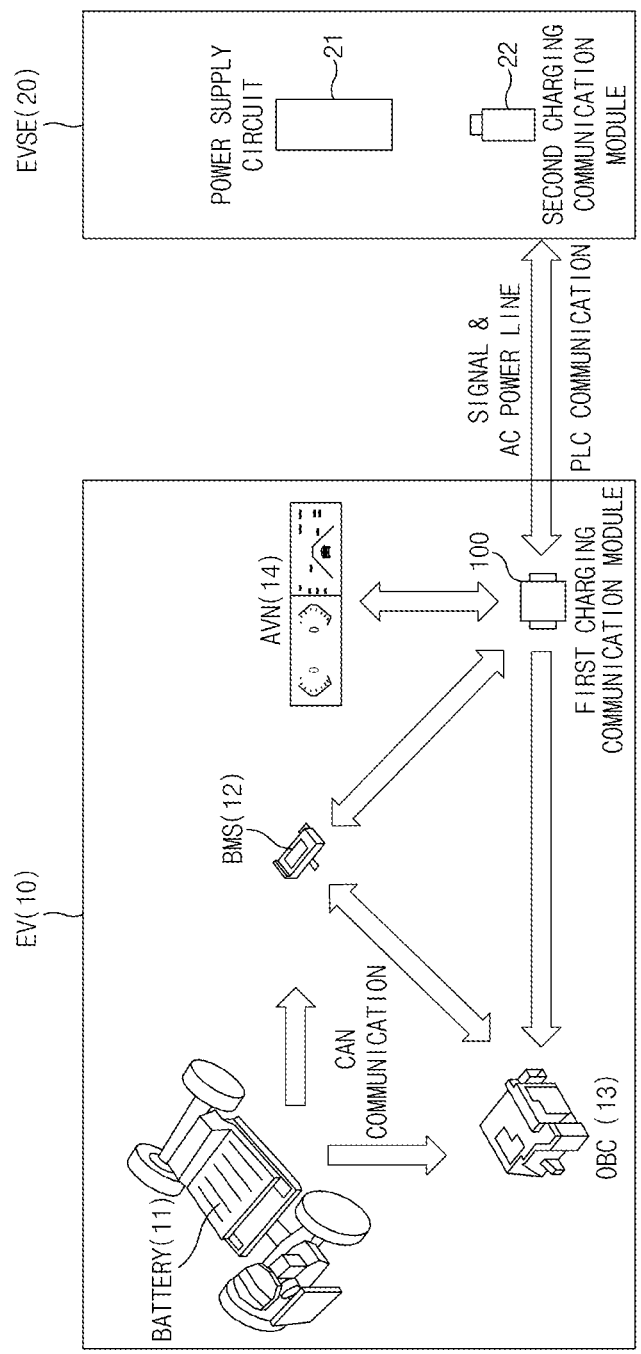
FIG. 2 is a diagram for describing an electric vehicle and a charging device, according to an embodiment of the present disclosure.

FIG. 2 is a diagram for describing an electric vehicle and a charging device, according to an embodiment of the present disclosure.

Referring to FIG. 2, the electric vehicle 10 may include a battery 11, a battery management system (BMS) 12, a battery charger 13 (e.g., an on-board charger (OBC)), and a first charging communication module 100.

The battery 11 may store electric energy.

The battery management system 12 that is a device managing the battery 11 so as to be used efficiently and safely may monitor a voltage, a current, a temperature, etc. of the battery 11 and may maintain the battery 11 in an optimum state.

The battery charger 13 may charge the battery 11 by using the electric energy provided from the charging device 20. For example, the battery charger 13 may boost (or step up) an AC power provided from the charging device 20, may convert the boosted AC power into a DC power, and may charge the battery 11 with the DC power thus converted.

The battery management system 12 and the battery charger 13 may exchange information with each other through a communication manner (e.g., CAN communication or Ethernet) for vehicle.

The first charging communication module 100 may exchange information with the battery charger 13, the battery management system 12, and an electronic device (e.g., an AVN (Audio Video Navigation) 14) of the electric vehicle 10 through the communication manner for vehicle.

Also, the first charging communication module 100 may exchange information with the charging device 20 through the charging cable. For example, the first charging communication module 100 may convert information of the communication manner for vehicle into information of the power line communication (PLC) manner so as to be sent to the charging device 20, and may convert information of the power line communication (PLC) manner provided from the charging device 20 into information of the communication manner for vehicle so as to be sent to electronic devices 14 of the electric vehicle 10.

The charging device 20 may include a power supply circuit 21 and a second charging communication module 22.

The power supply circuit 21 may provide electric energy to the electric vehicle 10 through the charging cable.

The second charging communication module 22 may be configured to make the communication between the charging device 20 and the electric vehicle 10 possible through the charging cable. For example, the second charging communication module 22 may convert information, which is provided from the electric vehicle 10 through the charging cable, from the power line communication manner to a communication manner available by the authentication institution or the charging exchange 30 and may provide the authentication institution or the charging exchange 30 with the information thus converted.

Figure 3:
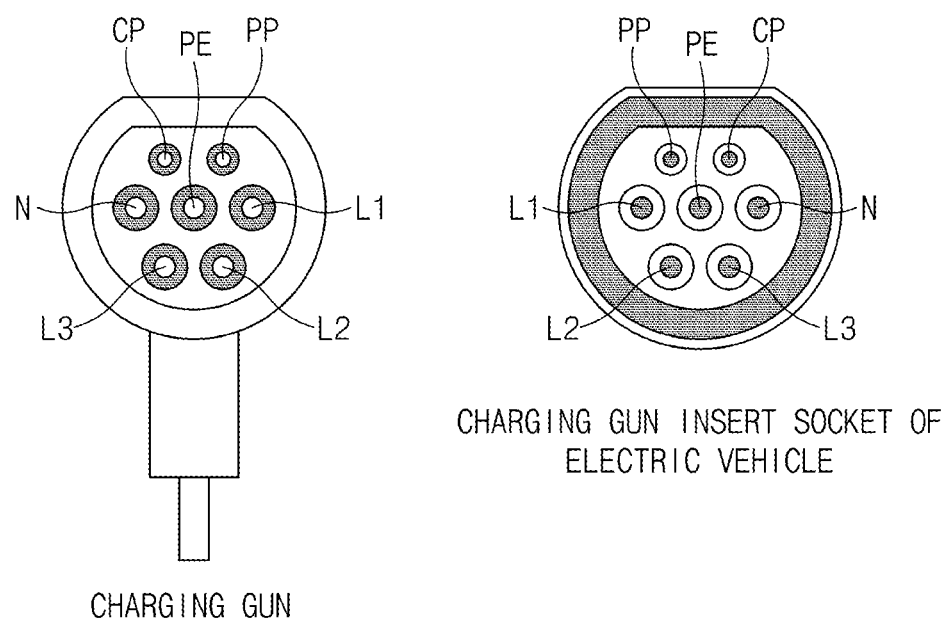
FIG. 3 is a diagram illustrating a charging gun with which a charging communication module of an electric vehicle is capable of be connected, according to an embodiment of the present disclosure.

FIG. 3 is a diagram illustrating a charging gun with which a charging communication module of an electric vehicle is capable of be connected, according to an embodiment of the present disclosure.

An example of a charging gun insertable in an electric vehicle is illustrated in FIG. 3. The charging cable that is connected with the charging gun may include a plurality of communication lines CP, PE, and PP, and a plurality of power supply lines N, L1, L2, and L3.

The charging gun may be connected with one end of the charging cable, and the plurality of communication lines CP, PE, and PP and the plurality of power supply lines N, L1, L2, and L3 embedded in the charging cable may protrude to the outside of the charging gun so as to be electrically connected with the electric vehicle.

As described above, both the transmission of electric energy to the electric vehicle and the communication between the electric vehicle and the charging device may be implemented through one charging cable in which the communication lines CP, PE, and PP and the power supply lines N, L1, L2, and L3 are embedded.

Because a distance between the communication lines CP, PE, and PP and the power supply lines N, L1, L2, and L3 is close, an overvoltage may be generated at the communication lines CP, PE, and PP through the coupling when a noise or an abnormal voltage occurs at the power supply lines N, L1, L2, and L3.

The charging communication module 100 of the electric vehicle according to an embodiment of the present disclosure may be electrically connected with the communication lines CP, PE, and PP of the charging cable to protect internal electronic devices of the electric vehicle 10 from the overvoltage capable of being generated at the communication lines CP, PE, and PP.

Also, because the charging communication module 100 of the electric vehicle according to an embodiment of the present disclosure transmits/receives information about a driver or owner of the electric vehicle 10, the charging communication module 100 may include an encryption module or algorithm for the purpose of preventing personal information from being leaked out or the electric vehicle 10 from being hacked.

In addition, because the charging communication module 100 of the electric vehicle according to an embodiment of the present disclosure is provided with pieces of information of the battery management system 12, the battery charger 13, and the charging device 20, the charging communication module 100 may provide the following as visual or auditory information to a driver or a passenger through the electronic device 14 of the electric vehicle 10 such as AVN: a required charging amount of the battery 11, a price of electric energy for charging the battery 11 as much as the required charging amount, and a battery state.

A configuration of the first charging communication module 100 included in the electric vehicle 10 and a configuration of the second charging communication module 22 included in the charging device 20 may be identical or similar.

Therefore, the first charging communication module 100 included in the electric vehicle 10 from among the first and second charging communication modules 100 and 21 will be described as an embodiment of the present disclosure, but the present disclosure is not limited thereto.

Below, a charging communication module of an electric vehicle according to an embodiment of the present disclosure will be described in detail.

Figure 4:
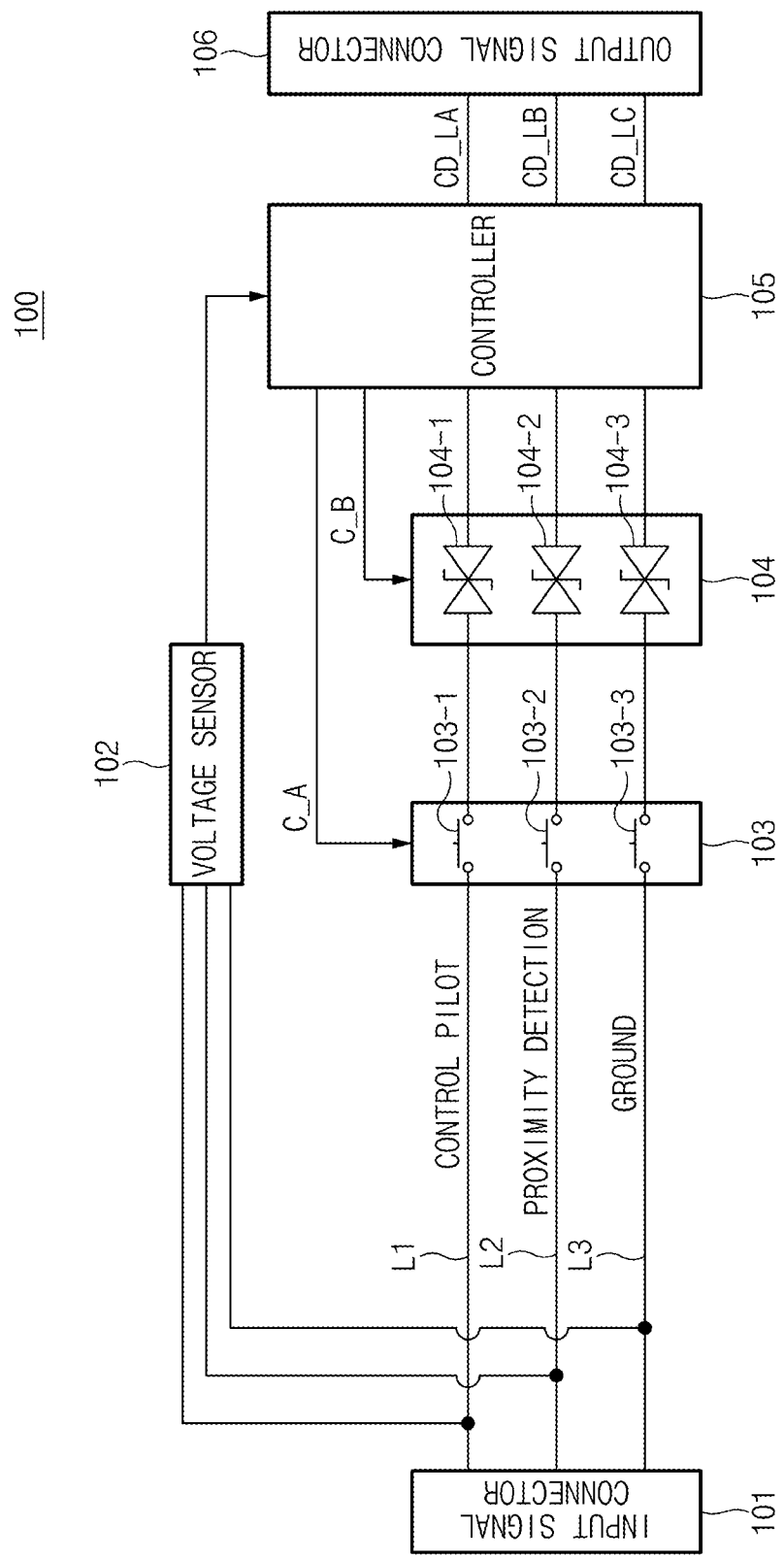
FIG. 4 is a diagram for describing a configuration of a charging communication module of an electric vehicle, according to an embodiment of the present disclosure.

FIG. 4 is a diagram for describing a configuration of a charging communication module of an electric vehicle, according to an embodiment of the present disclosure.

Referring to FIG. 4, the charging communication module 100 of the electric vehicle according to an embodiment of the present disclosure may include an input signal connector 101, a voltage sensor 102, a switch device 103, a filter device 104, a controller 105, and an output signal connector 106.

The input signal connector 101 may be electrically connected with the plurality of communication lines CP, PE, and PP included in the charging cable.

For example, the plurality of communication lines CP, PE, and PP included in the charging cable may include a first communication line CP, a second communication line PE, and a third communication line PP.

For example, the first communication line CP and the second communication line PE may be lines for transmitting/receiving data, and the third communication line PP may be a line for transmitting/receiving information indicating that the charging cable and the electric vehicle 10 are electrically connected through the charging gun. In this case, the second communication line PE may maintain a ground level, and the first communication line CP may transfer a voltage of a higher level than the ground level.

The remaining communication lines other than the second communication line PE maintaining the ground level, that is, the first communication line CP and the third communication line PP should transfer a voltage within an error range complying with a given standard. Accordingly, data may be transmitted/received based on a voltage level of the first communication line CP that is detected based on the voltage level of the second communication line PE.

Also, the input signal connector 101 may electrically connect the plurality of communication lines CP, PE, and PP included in the charging cable with a plurality of signal lines L1, L2, and L3, respectively.

For example, the first communication line CP may be electrically connected with a first signal line L1 through the input signal connector 101, the second communication line PE may be electrically connected with a third signal line L3 through the input signal connector 101, and the third communication line PP may be electrically connected with a second signal line L2.

The voltage sensor 102 may sense a voltage level of each of the plurality of signal lines L1, L2, and L3 electrically connected with the input signal connector 101 and may provide sensed information to the controller 105.

For example, the voltage sensor 102 may sense the voltage level of the first signal line L1 to generate first signal line voltage information and may provide the first signal line voltage information thus generated to the controller 105. Also, the voltage sensor 102 may sense the voltage level of the second signal line L2 to generate second signal line voltage information and may provide the second signal line voltage information thus generated to the controller 105. In addition, the voltage sensor 102 may sense the voltage level of the third signal line L3 to generate third signal line voltage information and may provide the third signal line voltage information thus generated to the controller 105.

The switch device 103 may electrically connect or disconnect each of the plurality of signal lines L1, L2, and L3 with or from the filter device 104 based on first control information C_A. For example, the switch device 103 may include a plurality of switches (e.g., first to third switches 103-1, 103-2, and 103-3).

The first switch 103-1 may electrically connect or disconnect the first signal line L1 with or from the filter device 104 depending on the first control information C_A that is based on the first signal line voltage information. The second switch 103-2 may electrically connect or disconnect the second signal line L2 with or from the filter device 104 depending on the first control information C_A that is based on the second signal line voltage information. The third switch 103-3 may electrically connect or disconnect the third signal line L3 with or from the filter device 104 depending on the first control information C_A that is based on the third signal line voltage information.

The filter device 104 may perform or stop a filtering operation based on second control information C_B. The filter device 104 may be interposed between the switch device 103 and the controller 105. The filter device 104 that performs the filtering operation depending on the second control information C_B may be electrically connected with the plurality of signal lines L1, L2, and L3 depending on the operation of the switch device 103 and may transfer voltages transferred from the plurality of signal lines L1, L2, and L3 through the switch device 103 to the controller 105.

In this case, the filter device 104 may transfer only a voltage within a given voltage level range to the controller 105.

That is, the filter device 104 may remove a noise (i.e., a voltage exceeding the given voltage level range) of signals received from the plurality of signal lines L1, L2, and L3 and may provide the controller 105 with noise-free signals.

The filter device 104 may include a plurality of filtering circuits (e.g., a TVS (Transient Voltage Suppressor) diode) that are respectively electrically connected with the plurality of switches 103-1, 103-2, and 103-3 respectively connected with the plurality of signal lines L1, L2, and L3.

For example, the filter device 104 may include first to third TVS diodes 104-1, 104-2, and 104-3. In this case, the TVS diode may transfer only a voltage within an allowable voltage level range.

The first TVS diode 104-1 may be connected with the first switch 103-1 that is electrically connected or disconnected with or from the first signal line L1. Also, a filtering operation of the first TVS diode 104-1 may be determined based on the second control information C_B.

The second TVS diode 104-2 may be connected with the second switch 103-2 that is electrically connected or disconnected with or from the second signal line L2. Also, a filtering operation of the second TVS diode 104-2 may be determined based on the second control information C_B.

The third TVS diode 104-3 may be connected with the third switch 103-3 that is electrically connected or disconnected with or from the third signal line L3. Also, a filtering operation of the third TVS diode 104-3 may be determined based on the second control information C_B.

In more detail, the filtering operation of the first TVS diode 104-1 may be determined based on the second control information C_B that is based on the first signal line voltage information. The first TVS diode 104-1 that performs the filtering operation may remove a noise component of a signal transferred through the first signal line L1 and the first switch 103-1 and may provide the noise component-removed (or noise-free) signal to the controller 105.

The filtering operation of the second TVS diode 104-2 may be determined based on the second control information C_B that is based on the second signal line voltage information. The second TVS diode 104-2 that performs the filtering operation may remove a noise component of a signal transferred through the second signal line L2 and the second switch 103-2 and may provide the noise component-removed (or noise-free) signal to the controller 105.

The filtering operation of the third TVS diode 104-3 may be determined based on the second control information C_B that is based on the third signal line voltage information. The third TVS diode 104-3 that performs the filtering operation may remove a noise component of a signal transferred through the third signal line L3 and the third switch 103-3 and may provide the noise component-removed (or noise-free) signal to the controller 105.

The controller 105 may be provided with information about a voltage level of each of the plurality of signal lines L1, L2, and L3 from the voltage sensor 102, may generate the first control information C_A and the second control information C_B based on the information, may provide the first control information C_A to the switch device 103, and may provide the second control information C_B to the filter device 104.

For example, the controller 105 may generate the first control information C A based on the information about the voltage level of each of the plurality of signal lines L1, L2, and L3 provided from the voltage sensor 102.

In more detail, when the voltage level of the third signal line L3 corresponds to a first connection reference voltage level (e.g., a ground voltage level), the controller 105 may generate the first control information C_A for electrically connecting the third signal line L3 and the filter device 104 and may provide the first control information C_A to the third switch 103-3.

Meanwhile, the controller 105 may determine the voltage level of the third signal line L3 based on the ground voltage level; when a result of the determination indicates that the voltage level of the third signal line L3 is higher than or equal to a first overvoltage determination reference voltage level, the controller 105 may generate the first control information C_A for electrically disconnecting the first to third signal lines L1, L2, and L3 from the filter device 104 and may provide the first control information C_A to the first to third switches 103-1, 103-2, and 103-3.

In this case, the first overvoltage determination reference voltage level may be higher than the first connection reference voltage level.

The controller 105 may determine the voltage level of the second signal line L2 based on the voltage level of the third signal line L3, that is, the ground voltage level, may generate the first control information C_A for electrically connecting the second signal line L2 with the filter device 104 or electrically disconnecting the first to third signal lines L1, L2, and L3 from the filter device 104 depending on a result of the determination, and may provide the first control information C_A thus generated to the second switch 103-2 or the first to third switches 103-1, 103-2, and 103-3.

For example, when a result of determining the voltage level of the second signal line L2 indicates that the voltage level of the second signal line L2 is higher than or equal to a second connection reference voltage level, the controller 105 may generate the first control information C_A for electrically connecting the second signal line L2 with the filter device 104 and may provide the first control information C_A thus generated to the second switch 103-2.

Meanwhile, when the result of determining the voltage level of the second signal line L2 indicates that the voltage level of the second signal line L2 is higher than or equal to a second overvoltage determination reference voltage level, the controller 105 may generate the first control information C_A for electrically disconnecting the first to third signal lines L1, L2, and L3 from the filter device 104 and may provide the first control information C_A thus generated to the first to third switches 103-1, 103-2, and 103-3.

In this case, the second overvoltage determination reference voltage level may be higher than the second connection reference voltage level.

The controller 105 may determine the voltage level of the first signal line L1 based on the voltage level of the third signal line L3, that is, the ground voltage level, may generate the first control information C_A for electrically connecting the first signal line L1 with the filter device 104 or electrically disconnecting the first to third signal lines L1, L2, and L3 from the filter device 104 depending on a result of the determination, and may provide the first control information C_A thus generated to the first switch 103-1 or the first to third switches 103-1, 103-2, and 103-3.

For example, when a result of determining the voltage level of the first signal line L1 indicates that the voltage level of the first signal line L1 is higher than or equal to a third connection reference voltage level, the controller 105 may generate the first control information C_A for electrically connecting the first signal line L1 with the filter device 104 and may provide the first control information C_A thus generated to the first switch 103-1.

Meanwhile, when the result of determining the voltage level of the first signal line L1 indicates that the voltage level of the first signal line L1 is higher than or equal to a third overvoltage determination reference voltage level, the controller 105 may generate the first control information C_A for electrically disconnecting the first to third signal lines L1, L2, and L3 from the filter device 104 and may provide the first control information C_A thus generated to the first to third switches 103-1, 103-2, and 103-3.

In this case, the third overvoltage determination reference voltage level may be higher than the third connection reference voltage level.

When all the first to third signal lines L1, L2, and L3 are connected with the filter device 104 by the first to third switches 103-1, 103-2, and 103-3, the controller 105 may generate the second control information C_B allowing the filter device 104, that is, the first to third TVS diodes 104-1, 104-2, and 104-3 to operate and may provide the second control information C_B to the first to third TVS diodes 104-1, 104-2, and 104-3.

In addition, the controller 105 may perform format conversion on information provided from the filter device 104 so as to be transferred to the output signal connector 106 through a plurality of data transmission lines CD_LA, CD_LB, and CD_LC or may perform format conversion on information provided from the output signal connector 106 through the plurality of data transmission lines CD_LA, CD_LB, and CD_LC so as to be transferred to the filter device 104.

For example, the controller 105 may convert information provided from the filter device 104 from a power line communication format to a communication format available within an electric vehicle so as to be provided to the output signal connector 106.

Meanwhile, the controller 105 may convert information provided from the output signal connector 106 from the communication format available within the electric vehicle to the power line communication format so as to be provided to the filter device 104.

Also, the controller 105 may store and parse information provided from at least one of the filter device 104 or the output signal connector 106 and may transfer the parsed information to at least one of the filter device 104 or the output signal connector 106.

The output signal connector 106 may electrically connect the charging communication module 100 according to an embodiment of the present disclosure with an internal electronic device of the electric vehicle 10. In this case, the output signal connector 106 may send information from the charging communication module 100 to the internal electronic device of the electric vehicle 10 or may receive information from the internal electronic device of the electric vehicle 10.

Figure 5:
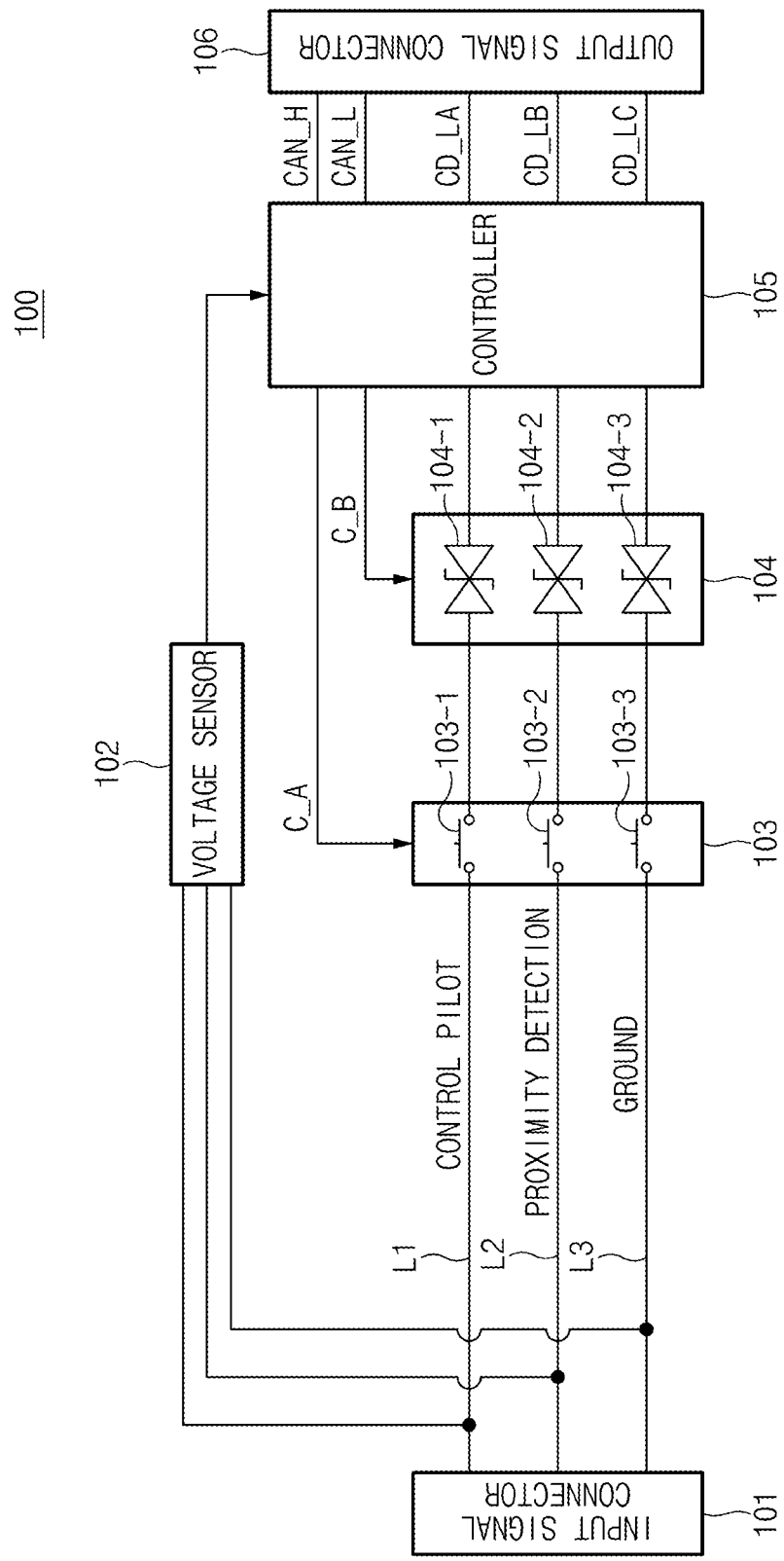
FIG. 5 is a diagram for describing a configuration of a charging communication module of an electric vehicle, according to another embodiment of the present disclosure.

FIG. 5 is a diagram for describing a configuration of a charging communication module of an electric vehicle, according to another embodiment of the present disclosure.

Referring to FIG. 5, the charging communication module 100 of an electric vehicle according to another embodiment of the present disclosure may include the input signal connector 101, the voltage sensor 102, the switch device 103, the filter device 104, the controller 105, and the output signal connector 106.

The charging communication module 100 of an electric vehicle according to another embodiment of the present disclosure illustrated in FIG. 5 may include the same configuration as the charging communication module 100 of an electric vehicle according to an embodiment of the present disclosure illustrated in FIG. 4 except for a connection relationship between the controller 105 and the output signal connector 106.

Referring to FIG. 5, the controller 105 may perform format conversion on information provided from the filter device 104 so as to be transferred to the output signal connector 106 through the plurality of data transmission lines CD_LA, CD_LB, and CD_LC and a plurality of dedicated transmission lines CAN_H and CAN_L.

For example, the controller 105 may perform format conversion on information provided from the filter device 104, may transfer a part of the converted information to the output signal connector 106 through the plurality of data transmission lines CD_LA, CD_LB, and CD_LC, and may transfer the remaining part of the converted information to the output signal connector 106 through the plurality of dedicated transmission lines CAN_H and CAN_L. In this case, the remaining part of the converted information transferred to the output signal connector 106 through the plurality of dedicated transmission lines CAN_H and CAN_L may be information of a given communication format.

Also, the controller 105 may perform format conversion on information provided from the output signal connector 106 through the plurality of data transmission lines CD_LA, CD_LB, and CD_LC and the plurality of dedicated transmission lines CAN_H and CAN_L so as to be transferred to the filter device 104.

For example, the controller 105 may be provided with a part of information provided from the output signal connector 106 through the plurality of data transmission lines CD_LA, CD_LB, and CD_LC and may be provided with the remaining part of the information provided from the output signal connector 106 through the plurality of dedicated transmission lines CAN_H and CAN_L. In this case, the information transferred to the controller 105 through the plurality of dedicated transmission lines CAN_H and CAN_L may be information of the given communication format.

A charging operation of an electric vehicle to which a charging communication module of an electric vehicle according to an embodiment of the present disclosure, which is implemented as described above, is applied is as follows.

As the charging gun connected with one end of the charging cable is inserted into the electric vehicle 10, the electric vehicle 10 and the charging device 20 may be electrically connected through the charging cable.

When the charging gun is inserted into the electric vehicle 10 and thus the electric vehicle 10 and the charging device 20 are electrically connected, the electric vehicle 10 and the charging device 20 may be capable of exchanging data (i.e., information) with each other through the charging cable, and the electric energy may be supplied from the charging device 20 to the electric vehicle 10 such that a battery of the electric vehicle 10 is charged.

As illustrated in FIG. 3, the charging cable may include the plurality of communication lines CP, PE, and PP and the plurality of power supply lines N, L1, L2, and L3.

In this case, the plurality of communication lines CP, PE, and PP may allow the electric vehicle 10 and the charging device 20 to exchange data (i.e., information) with each other through the power line communication (PLC).

Also, the electric vehicle 10 may be provided with electric energy from the charging device 20 through the plurality of power supply lines N, L1, L2, and L3 and may charge the battery of the electric vehicle 10.

As described above, for the electric vehicle 10 to be provided with the electric energy from the charging device 20, customer authentication of the driver or owner of the electric vehicle 10 and charging according to the amount of electric energy charged to the battery should be accompanied at the same time.

The electric vehicle 10 may exchange customer authentication and charging (or fare imposing) information with the charging device 20 through a communication line of the charging cable.

The charging communication module 100 of an electric vehicle according to an embodiment of the present disclosure may be electrically connected with a plurality of communication lines included in the charging cable and may make smooth data communication between the electric vehicle 10 and the charging device 20 possible.

An operation of a charging communication module of an electric vehicle according to an embodiment of the present disclosure, which may prevent internal electronic devices of the electric vehicle 10 from an overvoltage capable of being generated from a communication line and may make smooth data communication between the electric vehicle 10 and the charging device 20 possible, will be described in more detail below.

How a charging communication module of an electric vehicle according to an embodiment of the present disclosure operates after the electric vehicle 10 and the charging device 20 are connected through the charging cable and then communication lines of the charging cable and signal lines of the charging communication module 100 are electrically connected through the input signal connector 101 of the charging communication module 100 will be described in detail with reference to FIG. 4.

Referring to FIG. 4, the voltage sensor 102 may sense voltage levels of the first to third signal lines L1, L2, and L3, which are electrically connected with the first to third communication lines CP, PE, and PP of the charging cable through the input signal connector 101, and may provide a sensing result to the controller 105.

The controller 105 may generate the first and second control information C_A and C_B controlling operations of the switch device 103 and the filter device 104, based on the sensing result provided from the voltage sensor 102.

First, how the controller 105 controls the operation of the switch device 103 based on the sensing result provided from the voltage sensor 102 will be described.

When the voltage level of the third signal line L3 sensed by the voltage sensor 102 corresponds to the first connection reference voltage (e.g., ground voltage) level, the controller 105 may provide the third switch 103-3 with the first control information C_A for electrically connecting the third signal line L3 and the third TVS diode 104-3 of the filter device 104.

When the third signal line L3 and the third TVS diode 104-3 are electrically connected by the operation of the third switch 103-3 according to the first control information C_A, the controller 105 may generate the first control information C_A for controlling the operation of the second switch 103-2 based on the voltage level of the second signal line L2 sensed by the voltage sensor 102.

In this case, when the voltage level of the second signal line L2 is higher than the second connection reference voltage level, the controller 105 may generate the first control information C_A for electrically connecting the second signal line L2 with the second TVS diode 104-2 so as to be provided to the second switch 103-2.

When the second signal line L2 and the second TVS diode 104-2 are electrically connected by the operation of the second switch 103-2 according to the first control information C_A, the controller 105 may generate the first control information C_A for controlling the operation of the first switch 103-1 based on the voltage level of the first signal line L1 sensed by the voltage sensor 102.

In this case, when the voltage level of the first signal line L1 is higher than the third connection reference voltage level, the controller 105 may generate the first control information C_A for electrically connecting the first signal line L1 with the first TVS diode 104-1 so as to be provided to the first switch 103-1.

After the first to third signal lines L1, L2, and L3 are electrically connected with the first to third TVS diodes 104-1, 104-2, and 104-3 through the first to third switches 103-1, 103-2, and 103-3, respectively, the controller 105 may generate the second control information C_B for operating the first to third TVS diodes 104-1, 104-2, and 104-3 so as to be provided to the first to third TVS diodes 104-1, 104-2, and 104-3.

As described above, when the first to third signal lines L1, L2, and L3 are respectively electrically connected with the first to third TVS diodes 104-1, 104-2, and 104-3 by the first to third switches 103-1, 103-2, and 103-3, the first to third communication lines CP, PE, and PP of the charging cable may be electrically connected with the controller 105 through the first to third switches 103-1, 103-2, and 103-3 and the first to third TVS diodes 104-1, 104-2, and 104-3.

Also, the controller 105 may be electrically connected with internal electronic devices of the electric vehicle 10 through the output signal connector 106.

As a result, as the first to third communication lines CP, PE, and PP of the charging cable are electrically connected with the internal electronic devices of the electric vehicle 10, the controller 105 may receive information (i.e., data) provided from the charging device 20 and may send the received information to the internal electronic devices; the controller 105 may receive information from the internal electronic devices of the electric vehicle 10 and may send the received information to the charging device 20.

In this case, the controller 105 may convert information of the power line communication format received from the charging device 20 into information of the communication format available by the internal electronic devices of the electric vehicle 10 and may send the converted information to the internal electronic devices of the electric vehicle 10; the controller 105 may convert information of an electric vehicle communication format received from the internal electronic devices of the electric vehicle 10 into information of the power line communication format and may send the converted information to the charging device 20.

Also, the controller 105 may receive encrypted information from the charging device 20 and may decrypt the received information so as to be provided to the internal electronic devices of the electric vehicle 10; the controller 105 may encrypt information received from the internal electronic devices of the electric vehicle 10 so as to be provided to the charging device 20.

In addition, the controller 105 may store information received from at least one of the charging device 20 or the internal electronic devices of the electric vehicle 10, may parse the stored information, and may send the parsed information to at least one of the charging device 20 or the internal electronic devices of the electric vehicle 10.

Meanwhile, while information is being exchanged between the charging device 20 and the internal electronic devices of the electric vehicle 10, when an overvoltage is generated at at least one of the first to third communication lines CP, PE, and PP of the charging cable, the charging communication module 100 of the electric vehicle according to an embodiment of the present disclosure may electrically disconnect the internal electronic devices of the electric vehicle 10 from the charging device 20. Below, the above operation of the charging communication module 100 of an electric vehicle will be described in detail.

When an overvoltage is generated at the first to third communication lines CP, PE, and PP in a state where the first to third communication lines CP, PE, and PP are respectively electrically connected with the first to third signal lines L1, L2, and L3, an overvoltage may be generated even at a signal line electrically connected with a communication line at which the overvoltage is generated.

When the voltage level of the third signal line L3 is higher than the first overvoltage determination reference voltage level, the controller 105 may generate the first control information C_A for electrically disconnecting the first to third signal lines L1, L2, and L3 from the filter device 104.

When the voltage level of the second signal line L2 is higher than the second overvoltage determination reference voltage level, the controller 105 may generate the first control information C_A for electrically disconnecting the first to third signal lines L1, L2, and L3 from the filter device 104.

When the voltage level of the first signal line L1 is higher than the third overvoltage determination reference voltage level, the controller 105 may generate the first control information C_A for electrically disconnecting the first to third signal lines L1, L2, and L3 from the filter device 104.

That is, when a voltage level of any one of the first to third signal lines L1, L2, and L3 is higher than an overvoltage determination reference voltage level for determining whether an overvoltage is generated at the corresponding signal line, the controller 105 may generate the first control information C_A for electrically disconnecting the first to third signal lines L1, L2, and L3 from the filter device 104 such that the filter device 104 are electrically disconnected from the first to third signal lines L1, L2, and L3.

As a result, the charging communication module 100 of the electric vehicle according to an embodiment of the present disclosure may protect internal electronic devices of the electric vehicle from an overvoltage by electrically disconnecting the internal electronic devices of the electric vehicle from communication lines of the charging cable when an overvoltage is generated at a communication line of the charging cable.

According to the present disclosure, even though an overcurrent and an overvoltage are generated at a charging cable while charging an electric vehicle, internal electronic devices of the electric vehicle may be protected, and stable charging and communication may be performed. Accordingly, the convenience of the electric vehicle may be improved.

Besides, a variety of effects directly or indirectly understood through this disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A charging communication module of an electric vehicle, comprising:
    a voltage sensor configured to sense a voltage level of a signal line to generate a sensing result;
    a controller configured to generate first control information based on the sensing result and to convert information of a first communication format provided from the signal line into information of a second communication format; and
    a switch device configured to electrically connect or disconnect the signal line with or from the controller based on the first control information.

2. The charging communication module of claim 1, wherein the controller is configured to:
    generate the first control information for electrically disconnecting the signal line from the controller when the sensing result indicates that the voltage level of the signal line is higher than or equal to an overvoltage determination reference voltage level; and
    generate the first control information for electrically connecting the signal line with the controller when the sensing result indicates that the voltage level of the signal line is higher than or equal to a connection reference voltage level and lower than the overvoltage determination reference voltage level.

3. The charging communication module of claim 1, further comprising:
    a filter device interposed between the switch device and the controller,
    wherein the filter device transfers a voltage within a given voltage level range from the switch device to the controller.

4. The charging communication module of claim 3, wherein the controller is configured to:
    generate, based on the sensing result, second control information to control operation of the filter device.

5. The charging communication module of claim 4, wherein the controller is configured to:
    generate the second control information to allow the filter device to operate when the first control information for electrically connecting the signal line and the switch device is generated.

6. A charging communication module of an electric vehicle, comprising:
    a voltage sensor configured to generate a sensing result by sensing a voltage level of each of a plurality of signal lines electrically connected with a plurality of communication lines included in a charging cable;
    a switch device configured to electrically connect or disconnect the plurality of signal lines with or from a filter device based on first control information;
    the filter device configured to remove a noise included in information of the plurality of signal lines transferred from the switch device based on second control information;
    a controller configured to generate the first control information and the second control information based on the sensing result, and to convert and output information of a first communication format, from which the noise is removed by the filter device, into information of a second communication format.

7. The charging communication module of claim 6, wherein the plurality of communication lines include a first communication line, a second communication line, and a third communication line,
    wherein the first and third communication lines are lines transferring the information of the first communication format, and
    wherein the second communication line is a line transferring information about an electrical connection state of the charging cable and the electric vehicle.

8. The charging communication module of claim 7, wherein the plurality of signal lines include a first signal line, a second signal line, and a third signal line, and
    wherein the second signal line electrically connected with the second communication line is interposed between the first and third signal lines electrically connected with the first and third communication lines.

9. The charging communication module of claim 8, wherein the controller is configured to:
   compare a voltage level of each of the first to third signal lines and a connection reference voltage level of a corresponding signal line to generate the first control information for electrically connecting each of the plurality of signal lines with the filter device; and
   compare a voltage level of each of the first to third communication lines and an overvoltage determination reference voltage level of a corresponding signal line to generate the first control information for electrically disconnecting the plurality of signal lines with the filter device.

10. The charging communication module of claim 9, wherein the controller is configured to:
   generate the first control information for electrically connecting a signal line, a voltage level of which is higher than or equal to the connection reference voltage level of the corresponding signal line and lower than the overvoltage determination reference voltage level of the corresponding signal line, with the filter device; and
   generate the first control information for electrically disconnecting the first to third signal lines from the filter device when a voltage level of at least one of the first to third signal lines is higher than or equal to the overvoltage determination reference voltage level of the corresponding signal line.

11. The charging communication module of claim 7, wherein the switch device includes a first switch, a second switch, and a third switch,
   wherein the first switch electrically connects or disconnects the first signal line with or from the filter device based on the first control information,
   wherein the second switch electrically connects or disconnects the second signal line with or from the filter device based on the first control information, and
   wherein the third switch electrically connects or disconnects the third signal line with or from the filter device based on the first control information.

12. The charging communication module of claim 11, wherein the filter device includes a first TVS (Transient Voltage Suppressor) diode, a second TVS diode, and a third TVS diode,
   wherein the first TVS diode is electrically connected between the first switch and the controller,
   wherein the second TVS diode is electrically connected between the second switch and the controller, and
   wherein the third TVS diode is electrically connected between the third switch and the controller.

13. The charging communication module of claim 12, wherein each of the first to third TVS diodes transfers a voltage provided from each of the first to third switches to the controller, and the voltage transferred to the controller is a voltage of a given voltage level or lower.

14. A charging method of an electric vehicle, the method comprising:
   comparing a voltage level of a first communication line and a first connection reference voltage level to electrically connect the electric vehicle with the first communication line;
   comparing a voltage level of a second communication line and a second connection reference voltage level to electrically connect the electric vehicle with the second communication line;
   comparing the voltage level of the first communication line and a first overvoltage determination reference voltage level to electrically disconnect the first and second communication lines from the electric vehicle; and
   comparing the voltage level of the second communication line and a second overvoltage determination reference voltage level to electrically disconnect the first and second communication lines from the electric vehicle.

15. The method of claim 14, wherein the comparing of the voltage level of the first communication line and the first connection reference voltage level to electrically connect the electric vehicle with the first communication line includes:
   electrically connecting the first communication line with the electric vehicle when the voltage level of the first communication line is higher than or equal to the first connection reference voltage level,
   wherein the comparing of the voltage level of the second communication line and the second connection reference voltage level to electrically connect the electric vehicle with the second communication line includes:
   electrically connecting the second communication line with the electric vehicle when the voltage level of the second communication line is higher than or equal to the second connection reference voltage level.

16. The method of claim 14, wherein the comparing of the voltage level of the first communication line and the first overvoltage determination reference voltage level to electrically disconnect the first and second communication lines from the electric vehicle includes:
   electrically disconnecting the first and second communication lines from the electric vehicle when the voltage level of the first communication line is higher than or equal to the first overvoltage determination reference voltage level, and
   wherein the comparing of the voltage level of the second communication line and the second overvoltage determination reference voltage level to electrically disconnect the first and second communication lines from the electric vehicle includes:
   electrically disconnecting the first and second communication lines from the electric vehicle when the voltage level of the second communication line is higher than or equal to the second overvoltage determination reference voltage level.

* * * * *